(12) United States Patent
Gao

(10) Patent No.: US 8,490,042 B2
(45) Date of Patent: Jul. 16, 2013

(54) PERFORMING ROUTING OPTIMIZATION DURING CIRCUIT DESIGN

(75) Inventor: Tong Gao, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 224 days.

(21) Appl. No.: 12/608,434

(22) Filed: Oct. 29, 2009

(65) Prior Publication Data

US 2011/0055791 A1  Mar. 3, 2011

Related U.S. Application Data

(60) Provisional application No. 61/238,510, filed on Aug. 31, 2009.

(51) Int. Cl.
  *G06F 17/50* (2006.01)
(52) U.S. Cl.
  USPC ........... 716/126; 716/116; 716/129; 716/130; 716/131; 716/132
(58) Field of Classification Search
  USPC ................... 716/126, 131, 132, 116, 129, 130
  See application file for complete search history.

(56) References Cited

U.S. PATENT DOCUMENTS

| | | | |
|---|---|---|---|
| 2002/0120912 A1* | 8/2002 | He et al. ........................ | 716/12 |
| 2003/0023946 A1* | 1/2003 | Lin et al. ....................... | 716/17 |
| 2007/0028201 A1* | 2/2007 | Mehrotra et al. .............. | 716/12 |
| 2007/0101303 A1* | 5/2007 | Lien et al. ..................... | 716/5 |
| 2009/0172628 A1* | 7/2009 | Chyan et al. .................. | 716/13 |
| 2009/0300561 A1* | 12/2009 | Tong et al. ..................... | 716/5 |

\* cited by examiner

*Primary Examiner* — Sun Lin
(74) *Attorney, Agent, or Firm* — Park, Vaughan, Fleming & Dowler, LLP; Fang Chen

(57) ABSTRACT

One embodiment of the present invention provides a system that concurrently optimizes multiple routing objectives during routing of an integrated circuit (IC) chip design. During operation, the system starts by receiving a routing solution for the IC chip design and a set of routing objectives. The system then partitions the IC chip design into a set of partitions. Next, for each partition in the set of partitions, the system optimizes the routing solution by, iteratively: (1) analyzing the routing solution to determine weights for the set of routing objectives; (2) constructing a cost function based on the weights for the set of routing objectives; and (3) modifying the routing solution within the partition to attempt to optimize the cost function.

21 Claims, 17 Drawing Sheets

PERFORMING ROUTING OPTIMIZATION DURING CIRCUIT DESIGN

RELATED APPLICATION

This application claims priority to U.S. Provisional Application Ser. No. 61/238,510, entitled "Dynamic Grid, Concurrent Optimization, Soft Rules, and Redundant Via Insertion," by Tong Gao and Abhijit Chakankar, filed on 31 Aug. 2009.

The subject matter of this application is related to the subject matter in a co-pending non-provisional application Ser. No. 12/608,418 by inventor Tong Gao, filed on the same day as the instant application, entitled "Method and Apparatus for Routing Using a Dynamic Grid".

Further, the subject matter of this application Ser. No. 12/608,446 is related to the subject matter in a co-pending non-provisional application by inventors Abhijit Chakanakar and Tong Gao, filed on the same day as the instant application, entitled "Method and Apparatus for Performing Redundant Via Insertion During Circuit Design".

Additionally, the subject matter of this application is related to the subject matter in a co-pending non-provisional application Ser. No. 12/608,470 by inventor Tong Gao, filed on the same day as the instant application, entitled "Method and Apparatus for Satisfying Routing Rules During Circuit Design".

BACKGROUND

1. Technical Field

The present invention relates to electronic design automation (EDA). More specifically, the present invention relates to a method and a system for concurrently optimizing multiple routing objectives during the design of an IC chip.

2. Related Art

Advances in semiconductor technology presently make it possible to integrate large-scale systems, including hundreds of millions of transistors, onto a single semiconductor chip. This dramatic increase in semiconductor integration densities has made it considerably more challenging to efficiently perform routing in such a large-scale IC chip.

Routing an integrated circuit (IC) chip involves determining routes for metal wires which electrically connect integrated circuit devices to produce circuits that perform desired functions. Large scale IC chips are typically routed using routing software, which is typically referred to as a "routing system" or "router."

During a routing process, router needs to optimize a routing solution based on a set of routing objectives. Conventional techniques typically optimize various optimization objectives in a serial or sequential manner. For example, a conventional technique may begin by eliminating "difficult" design rule violations (e.g., different net design rule violations). Next, the conventional technique may eliminate "easy" design rule violations (e.g., same net design rule violations). Once all design rule violations have been eliminated, the technique may then further perturb the routing solution to optimize other parameters.

Unfortunately, these optimization objectives are often inter-related, and hence a sequential optimization can increase convergence time and result in suboptimal routing solutions. For example, once a conventional technique has eliminated design rule violations, the technique may perturb the design to optimize DFM-related optimization objectives, but doing so may create new design rule violations, which will need to be fixed by performing an additional iteration of the routing optimization process. As a result, a sequential approach for optimizing the optimization objectives can increase the convergence time. Furthermore, when a conventional technique eliminates DRC violations, the technique is usually oblivious to other optimization objectives. Unfortunately, once the approach eliminates DRC violations, it may not be able to sufficiently optimize other objectives because most of the routing decisions have already been made by this stage without any consideration of the other objectives.

SUMMARY

One embodiment of the present invention provides a system that concurrently optimizes multiple routing objectives during routing of an integrated circuit (IC) chip design. During operation, the system starts by receiving a routing solution for the IC chip design and a set of routing objectives. The system then partitions the IC chip design into a set of partitions. Next, for each partition in the set of partitions, the system optimizes the routing solution by, iteratively: (1) analyzing the routing solution to determine weights for the set of routing objectives; (2) constructing a cost function based on the weights for the set of routing objectives; and (3) modifying the routing solution within the partition to attempt to optimize the cost function.

In some variations, the system analyzes the routing solution to determine weights for the set of routing objectives by: (1) evaluating a degree of importance for each of the routing objectives; and (2) assigning a weight to a routing objective based at least on the associated degree of importance.

In some variations, the system assigns a higher weight to a routing objective associated with a higher degree of importance.

In some variations, the system evaluates a degree of importance for a routing objective by counting a total number of violations associated with the routing objective within the partition, wherein a higher number of violations is associated with a higher degree of importance.

In some variations, the system constructs the cost function by: (1) obtaining individual cost functions associated with the routing objectives; and (2) using the weights to construct the cost function as a weighted sum of the individual cost functions.

In some variations, the system modifies the routing configuration within the partition by performing a rip-up-and-reroute operation within the partition to attempt to optimize the cost function.

In some variations, the system terminates the iterative process within a partition when the associated cost function is sufficiently optimized.

In some variations, the set of partitions can have the same size or different sizes.

In some variations, the set of routing objectives can include: (1) different-net DRC; (2) same-net DRC; and (3) antenna DRC.

In some variations, the routing solution of the IC chip design includes routing paths located on multiple metal layers.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Integrated Circuit Design Flow

Figure 1:
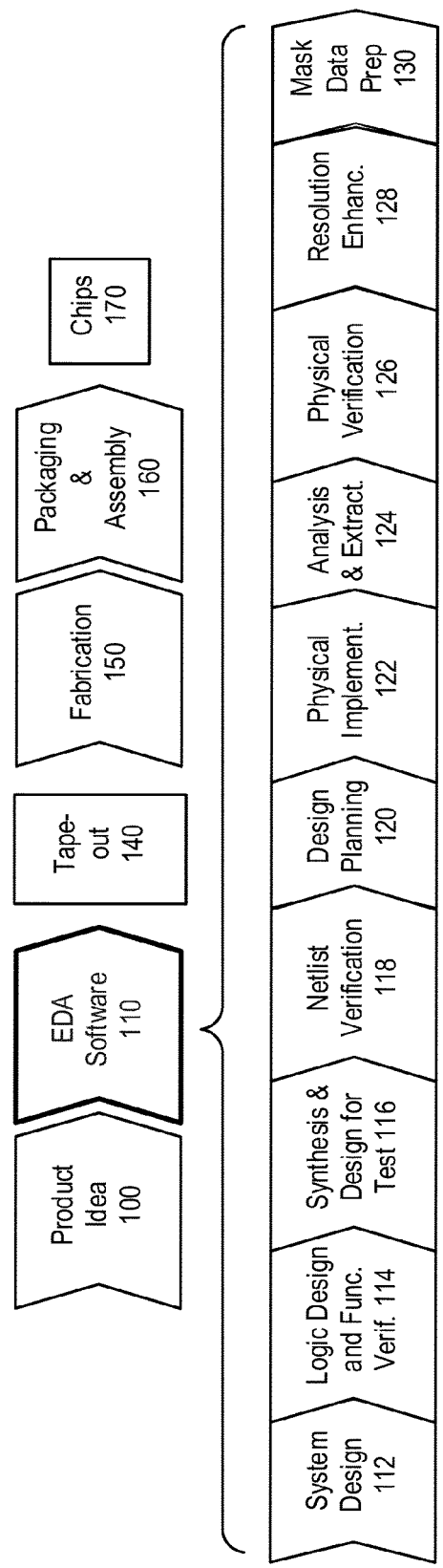
FIG. 1 illustrates various steps in the design and fabrication of an integrated circuit.

FIG. 1 illustrates various steps in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPILER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this, in turn, permits what-if refinement. Exemplary EDA software products from SYNOPSYS, INC. that can be used at this stage include ASTRORAIL®, PRIMERAIL®, PRIMETIME®, HSPICE®, HSIM®, NANOTIME®, NANOSIM® and STAR-RCXT® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGED® products.

Mask data preparation (stage 130): This stage provides the tape-out data for production of masks to produce finished chips. Exemplary EDA software products from SYNOPSYS, INC. that can be used at this stage include the CATS® family of products.

Embodiments of the present invention can be used during one or more of the above-described steps. Specifically, one embodiment of the present invention can be used during the physical implementation step 122.

The Routine Problem

Routing an integrated circuit (IC) chip involves determining routes for metal wires which electrically connect integrated circuit devices to produce circuits that perform desired functions. Large-scale IC chips are typically routed using routing software, which is typically referred to as a "routing system" or "router." The function of a router may be considered as solving "routing problems." In the discussion that follows, the terms "routing system," "router," and "system" are used interchangeably.

When solving a routing problem, a router typically starts by receiving multiple inputs, which can include, but are not limited to: (a) a placed netlist which provides the locations of the circuit cells/blocks (hereinafter "blocks"), (b) a description of the technology, which can further include the number of metal layers, and the characteristics of the layers, (c) the assignment of pins/terminals on the blocks according to the netlist, (d) a set of design rules that need to be satisfied by the routing solution, and (e) timing information, e.g., timing criticality. The router then determines how to route wires (i.e., in the metal layers) through the physical layout to couple associated pins/terminals on a given netlist. These identified wires connecting pins/terminals on the given netlist subsequently form a "net." During this process, the router adheres to the set of design rules while routing wires between blocks. The routing subsequently generates a routing solution as output, which can include, but is not limited to, placed wires which electrically connect all pins/terminals that belong to the same net.

Note that the routing solution typically does not electrically connect pins or terminals that belong to different nets. Furthermore, the routing solution comprises routed wires which are based on the available routing resources, and these routed wires should not violate certain design rules, which are usually provided as an input to a routing problem. For example, some design rules may specify that two wires should not be routed too close to each other and that certain types of routing shapes are not allowed. Some of these design rules are provided by the manufacturer or the foundry, and therefore are referred to as "foundry design rules." If a routing solution violates a foundry design rule, the circuit design may not be signed-off. Hence, a foundry design rule is often referred to as a "hard design rule." Note that the design rules that need to be satisfied during a routing process may be different from the design rules that need to be satisfied in a different stage in the electronic design automation (EDA) design flow. For example, the design rules that are used during design signoff may be more precise and complicated than the design rules that are used during the routing stage.

Figure 2:
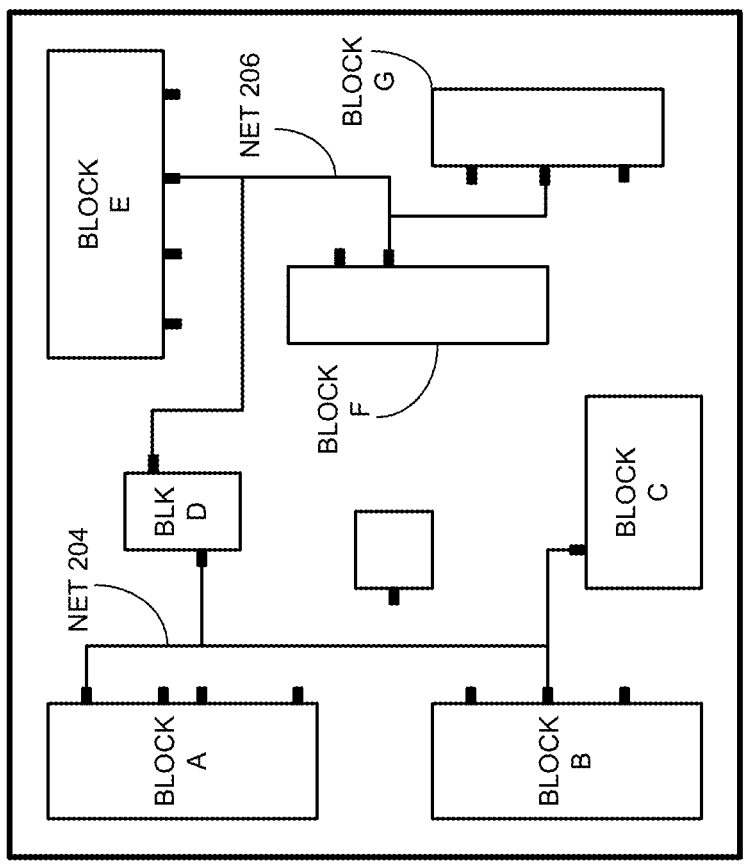
FIG. 2 illustrates the routing problem associated with an IC chip design in accordance with an embodiment of the present invention.

FIG. 2 illustrates the routing problem associated with IC chip design 202 in accordance with an embodiment of the present invention. The blocks illustrated in FIG. 2 can represent circuit objects at any level in the design hierarchy. For example, the blocks can be cells or macros or any other circuit object at any level of hierarchy. The routing task can be performed at different levels in the design hierarchy. However, the routing technique typically operates at only one level at any given time. The locations of the blocks in FIG. 2 may be determined during the placement stage of the EDA design flow, which typically occurs prior to the routing process.

Each block in IC chip design 202 can have one or more pins or terminals as illustrated in FIG. 2. As mentioned previously, the assignment of pins or terminals to their respective nets may also be provided as an input to the routing problem. During the routing process, the router determines a routing solution to the routing problem so that the pins or terminals that belong to the same net are electrically connected. For example, in FIG. 2, the solid lines interconnecting pins from blocks A, B, C, and D belong to net 204, and the solid lines interconnecting pins from blocks D, E, F, and G belong to net 206.

A routing process typically has three stages: global routing, track assignment, and detailed routing. However, a routing process may have more or fewer stages. For example, some techniques combine the last two stages so that they only have two stages: global routing and detailed routing. In another example, there might be a fourth stage after detailed routing which places redundant vias.

In the global routing stage, the router does not create detailed routing shapes for the wires. Instead, the router determines a high-level plan for routing the wires by partitioning the chip into so-called "g-cells."

Note that during the placement stage some techniques may perform a trial routing to guide the placement. For example, the placement technique may perform a quick and approximate routing to determine whether a particular placement of cells is expected to create routing congestion. The result from the trial routing may be used during the global-routing stage. Trial routing may also be used for determining timing estimates.

In the track assignment stage, the router refines the global routing plan by assigning wires to tracks. Note that, although the track assignment may generate detailed routes for the wires, the routing solution at this stage may not satisfy all of the design rules, because this stage typically uses a simpler routing model than the next stage, namely, detailed routing.

Finally, in the detailed routing stage, the router starts with the coarse results produced by the global routing, and creates an exact path and the specific shapes for each wire. This stage is typically the most time-consuming and computationally intensive stage among the three routing stages. The design rules are typically analyzed during this stage to ensure that the routed wires do not violate any of the design rules. Note that the rip-up-and-reroute decisions are often made during this stage.

Routing techniques typically operate at one physical hierarchy at a time. For example, during block level routing as illustrated in FIG. 2, the system does not consider the physical details inside the cells or the macros. At this level the router typically represents macros and standard cells by blocks to hide unnecessary details, thereby speeding up the routing process.

Routing can be performed using different approaches. For example, routing can be performed using a top-down approach or a bottom-up approach. In the top-down approach, the top-level routing is performed before bottom-level routing. In this approach, the system may create soft macros which reserve space for routing the lower hierarchies. In contrast, in the bottom-up approach, the bottom-level routing is performed before the top-level routing. Since the lower-level routing is performed before higher-level routing, soft macros are usually not required in this approach.

A routing problem can also specify a number of optimization criteria which need to be considered during the routing process. Specifically, the optimization criteria can include, but are not limited to: (a) minimizing design rule violations, (b) minimizing via count, (c) minimizing total wire length, (d) minimizing the likelihood of timing violations, and (e) criteria related to design for manufacturing (DFM). The criteria related to DFM can further include, but are not limited to, placing redundant vias, attempting to minimize critical area to reduce the probability that contamination particles will cause shorts and opens during manufacturing, and attempting to maximize straight wire segments to decrease layout complexity and increase manufacturability. Note that conventional routing techniques typically consider the first three optimization criteria, i e., minimizing design rule violations, minimizing via count, and minimizing wire length. However, conventional routing techniques typically do not consider the DFM criteria, which are left for the later stages in the EDA design flow.

Note that it may not be possible to "optimize" (e.g., minimize) all of the criteria at the same time. In fact, it may not be possible to determine a global optimum for even a single criterion. Hence, terms such as "optimizing," "minimizing," "maximizing," etc. are used in this disclosure to indicate that the routing process tries to optimize one or more criteria (e.g., tries to minimize the number of design rule violations), but the routing process may terminate before a global optimum is determined for one or more criteria.

Timing consideration is an important aspect during the routing process. Specifically, a routing process can receive a set of critical nets. For example, the system can determine a trial routing solution (e.g., the trial routing solution can be determined during placement or timing analysis). The trial routing solution is an estimate of the actual routing solution, and can be used to identify critical nets which need special handling during the actual routing process. Next, the system can perform timing analysis on the trial routing solution to identify a set of critical nets, and provide the set of critical nets to the routing stage. During the routing stage, the system can ensure that the delays on the critical nets are minimized to reduce or eliminate timing constraint violations.

Note that conventional techniques typically optimize the various optimization criteria in a serial or sequential fashion. For example, a conventional technique may begin by optimizing the wire length to obtain an initial routing solution. Next, the conventional technique may perturb the initial routing solution to minimize via count and design rule violations. The technique may then further perturb the perturbed routing solution to optimize other parameters. Unfortunately, this serial approach can result in suboptimal routing solutions.

Grid-Based Routing

One of the core components of a router is a search engine. The problem that the search engine solves is as follows: given two sets of points, e.g., set A and set B, the search engine determines paths for wires for electrically connecting these two sets of points.

Figure 3:
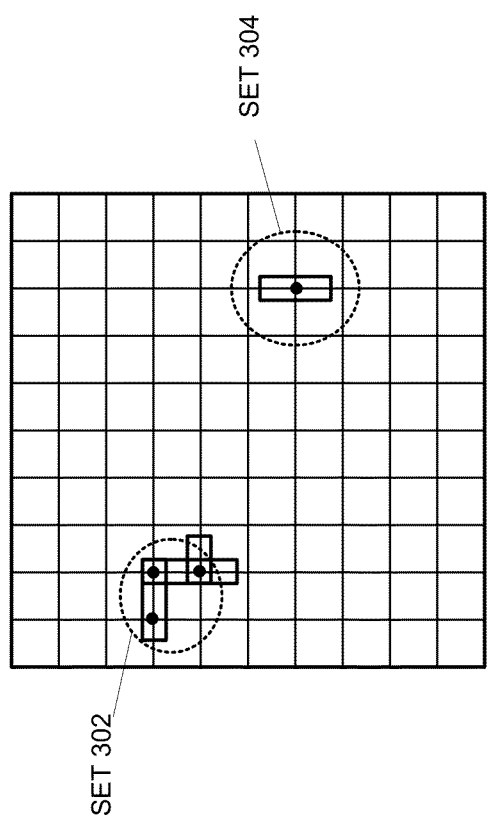
FIG. 3 illustrates an exemplary routing problem that a search engine attempts to solve in accordance with an embodiment of the present invention.

FIG. 3 illustrates an exemplary routing problem that a search engine attempts to solve. As is illustrated in FIG. 3, a first set 302 includes three electrically interconnected points (filled circles), and a second set 304 includes a single point. Note that a point can refer to existing components, or it can be a tapping point from the new routes to existing components. The search engine then attempts to find a path to connect any of the points in set 302 to the point in set 304.

One technique for finding paths in an IC chip design during a routing process involves constructing a three-dimensional (3D) regular grid structure (also referred to as a "3D maze") to represent the routing resources in the multiple metal layers. This 3D grid can be represented as a graph, and paths can be determined in the 3D grid by using graph-based techniques.

In some embodiments, the 3D grid is formed from a set of 2-dimensional (2D) grids, wherein each 2D grid represents routing resources in a respective metal layer in the multiple metal layers. More specifically, a 2D grid further comprises one or two sets of parallel grid lines. To maintain proper alignment between adjacent 2D grids, some traditional techniques make all pitches of the 2D grids multiples of the smallest pitch in the set of 2D grids.

Figure 4:
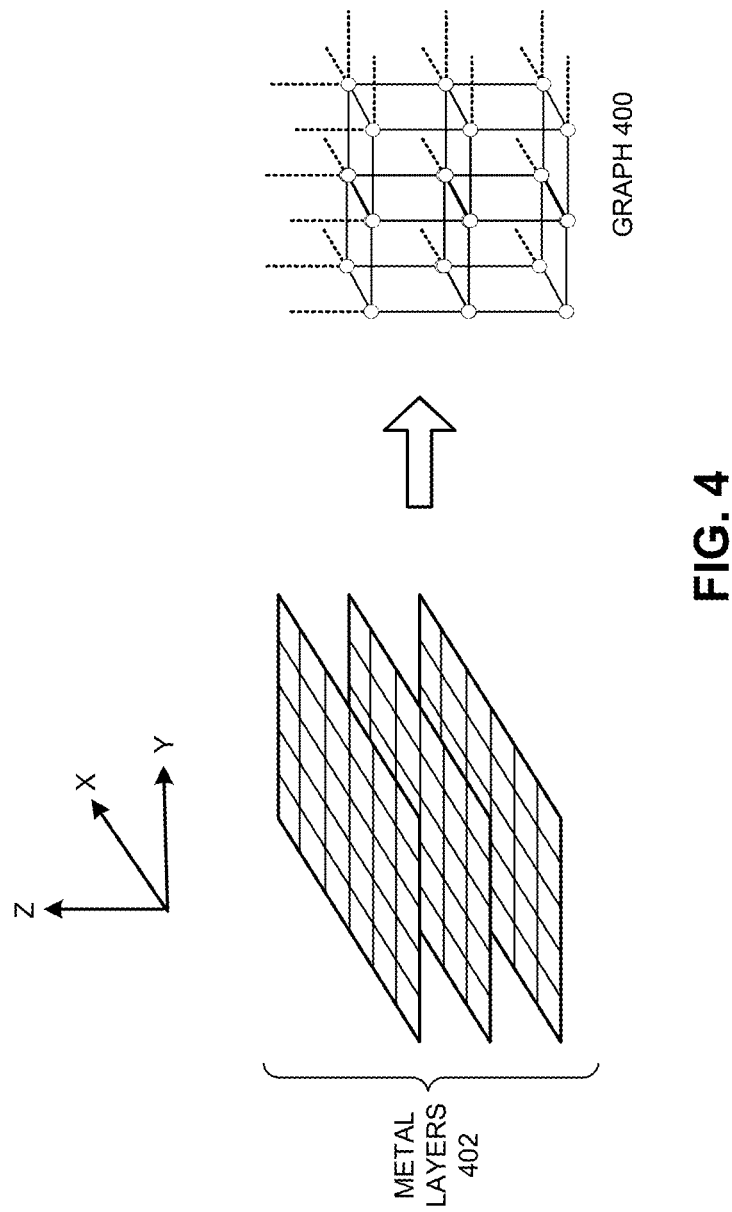
FIG. 4 illustrates how the routing resources (e.g., metal wires) associated with the multiple metal layers can be represented using a graph in accordance with an embodiment of the present invention.

FIG. 4 illustrates an embodiment of representing the routing resources (e.g., metal wires) associated with multiple metal layers 402 using a graph 400 in accordance with an embodiment of the present invention. As illustrated in FIG. 4, graph 400 is a 3D grid which is formed by a stack of 2D grids corresponding to multiple metal layers 402. Note that each point which can be electrically connected to another point is located at a vertex in graph 400, and a wire that electrically connects two points is associated with a path between two vertices in graph 400.

The metal layers and the corresponding graph representation shown in FIG. 4 may suggest that wires can be routed either along the X-direction or the Y-direction in a given metal layer. In practice, each metal layer typically has a preferred routing direction, i.e., wires are preferably routed in either the X-direction or the Y-direction. However, exceptions are possible, i.e., in a metal layer whose preferred routing direction is along the X-axis, the system may route a wire segment in the Y-direction, and vice versa. The search engine can be instructed to either prefer or strictly enforce routing wires in a particular direction for each metal layer. For example, the system can assign different costs to edges in the X-direction and edges in the Y-direction to encourage the search engine to route wires in the preferred direction. Alternatively, the system can store the preferred direction for each metal layer, and the search engine can use this information while searching for a route.

Note that in FIG. 4, because the 3D grid of graph 400 is a regular structure, routes can only be determined if the starting point and the end point are on the 3D grid. Moreover, each layer has to have tracks that are properly aligned.

Unfortunately, a pin may not be located on the 3D grid. Specifically, to optimize performance and/or size, a user may place the pins of a standard cell at off-grid locations. Furthermore, different metal layers may have different properties, and hence, forcing all of the metal layers to align their tracks may unnecessarily constrain the routing process and lead to suboptimal routing.

Generally, at lower metal layers, the wires can be closer to each other than at upper metal layers because upper metal layers have to account for topography variations in the wafer's surface that accumulate as the metal layers are manufactured on top of one another.

For example, the minimum distance between wires for a lower layer L1 may be 2 units, but for an upper layer L2, the minimum distance may be 3 units. However, to ensure that the grid lines in different layers in a 3D grid are properly aligned, a conventional technique may route wires in L2 that are at least 4 units apart (i.e., a multiple of 2 units), instead of routing them so that they are at least 3 units apart. The technique reduces useable tracks in L2, which can lead to suboptimal routing. Alternatively, all misaligned tracks can be propagated to all layers. The approach, however, can create a very densely aligned maze map, which can significantly degrade both run time and QoR. Note that the grid structure in conventional approaches, such as grid 400 in FIG. 4, is static. Furthermore, in conventional techniques, all layers have the same number of grid-lines per unit distance, which can also cause suboptimal routing.

Figure 5:
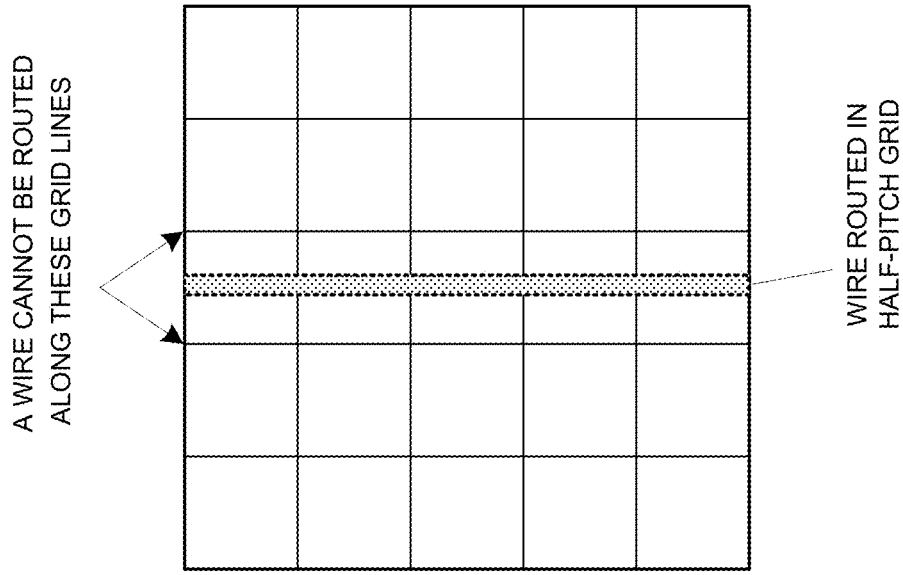
FIG. 5 illustrates how fragmentation can occur when a wire is routed in a half pitch grid in accordance with an embodiment of the present invention.

Some techniques can use a half-pitch grid, wherein wires can be routed with two subpitches in between regular grid lines. However, these techniques can lead to wasted fragmented routing space. FIG. 5 illustrates how fragmentation can occur when a wire is routed in a half-pitch grid.

As mentioned previously, if a pin is not located on a grid line in the 3D grid, then wires typically cannot be routed to/from this pin, which is referred to as an "off-grid" pin. Conventional techniques add an off-grid track that passes through the off-grid pin to overcome this problem. Unfortunately, these techniques often propagate each off-grid track for a given off-grid pin to multiple layers (one per each metal layer). Moreover, since the 3D grid structure is static in conventional techniques, all of these off-grid tracks need to be generated for all off-grid pins before routing starts, which can be extremely wasteful in terms of memory usage and processing time.

Routing Using Dynamic Grid

Some embodiments of the present invention overcome the shortcomings of traditional grid-based routing techniques. Note that when routing is performed on a chip, it is typically performed on a partition-by-partition basis, i.e., the chip is divided into multiple partitions, and routing is performed on each partition.

Some embodiments of the present invention use a grid that includes two components: a static component which does not change during the routing process, and a dynamic component which can change from connection to connection during the routing process. The static component does not require grid lines in different metal layers (which can correspond to different 2D grids) to be aligned, and also does not require the grid lines in a particular metal layer to be equally spaced. The dynamic component allows the system to dynamically create grid lines (referred to as "dynamic grid lines") for handling pin locations that do not fall on the static grid. In some embodiments of the present invention, the dynamic grid lines created for off-grid pins within a given layer are not propagated to all layers, which is different from the conventional techniques.

Figure 6:
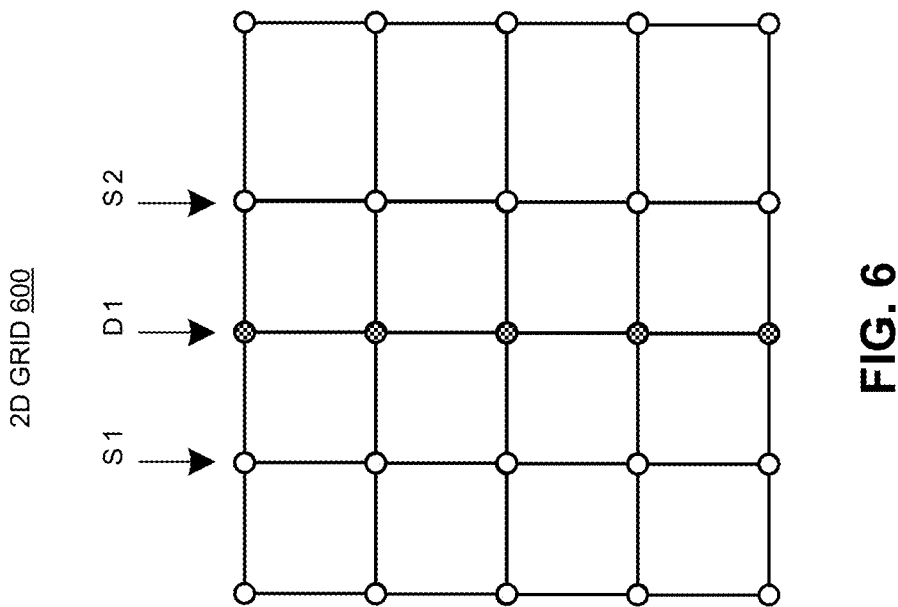
FIG. 6 illustrates a 2D grid which comprises a dynamic grid line D1 placed between two static grid lines S1 and S2 in accordance with an embodiment of the present invention.

FIG. 6 illustrates a 2D grid 600 which comprises a dynamic grid line D1 placed between two static grid lines S1 and S2 in accordance with an embodiment of the present invention. Note that, in FIG. 6, vertices on dynamic grid line D1 are shaded.

When the system is routing wires for net N1, it may perform routing using a grid that is made of static component S, and dynamic component D1, but when the system is routing wires for net N2, it may perform routing using a grid that is made of static component S (which is the same as that of net N1) and dynamic component D2 (which is different from D1). In this manner, by splitting the grid into these two parts, the routing process can handle off-grid pins without requiring a large amount of memory or processing time. Note that the complete view of the grid is provided by a combination of the static grid and the dynamic grid. Furthermore, the system can hide the internal details of the static and dynamic grids, so that the search engine views the entire grid as a single, homogenous grid. In some embodiments, each static grid line or dynamic grid line is required to be full length, and no dead-end tracks are allowed in a grid.

Note that the static component of the grid in embodiments of the present invention is different from conventional grids in at least two aspects. First, the grid line pitches do not have to be the same in a given metal layer, i.e., a regular structure is not required. For example, some grid lines can be 2 units apart, while others can be 3 units apart within the same metal layer. Second, the grid lines in different metals layers do not have to be aligned.

Unlike conventional techniques, the 3D grid in embodiments of the present invention may not be represented by a regular 3D array, because the 3D grid is not perfectly regular. However, a 3D grid in embodiments of the present invention may be represented by explicitly specifying the adjacency, e.g., by explicitly specifying which vertex is adjacent to which vertex in the X, Y, and/or Z direction.

Specifically, some embodiments of the present invention represent a "semi-regular" 3D grid using an array of 2D arrays. Each 2D array can represent the grid vertices in a metal layer. The routing resources can be represented as a 1D array of 2D arrays. Specifically, each element of the 1D array can point to a 2D array which represents the routing resources in a particular metal layer. In some embodiments, each 2D array can be stored as a 1D array. For example, if the 2D array has M rows and N columns, then element [i][j] can be stored at location i+M*j.

In some embodiments, each element in the 2D array for a given metal layer can store the indices of the adjacent vertices in the X and Y direction. Adjacency in the Z direction can be specified by storing in the array element the indices of the adjacent vertex in the Z direction. For example, if the vertex associated with element [6][8] in metal layer 1 is located directly below the vertex associated with element [3][4] in metal layer 2, then element [6][8] in metal layer 1 can store the indices (3,4) to provide the adjacency in the upward Z direction (note that the indices of the adjacent vertex in the upper and lower layers act like a pointer to the vertex). Similarly, the array element can also store the indices of the adjacent element in the downward Z direction.

Note that each element in the 2D arrays can store information to help the search engine to search a path during a routing process. For example, each element may store the distance to the four adjacent vertices in the same metal layer. If the distance between the vertices is constant within a particular layer, the system may store the constant distance once for the entire layer (as opposed to storing it in each array element), thereby reducing memory requirements.

The array elements can also store blockage information. For example, if a wire should not be routed over a particular area in the metal layer, the array elements corresponding to that area can store an indicator which indicates to the search engine that it should not route the wire through this area.

If a wire needs to travel from layer 1 to layer 3, it may need to travel a short distance in layer 2 (because the grid lines in different metal layers may not be aligned), which can be undesirable. However, the search engine can be instructed to avoid paths that require such short wire segments. This requirement is expected to have a minimal impact on the quality of the routing solution, because typically there are numerous paths between two points in the grid; hence, it should be possible to find an equally good path that does not have a short segment in a layer.

Some embodiments of the present invention combine a dynamic 3D grid with the static 3D semi-regular grid. Specifically, the embodiment can use the dynamic 3D grid to represent off-grid lines for handling off-grid pins. The two grids can be combined by using appropriate "pointers" between vertices of the static 3D semi-regular grid and the dynamic 3D grid (a "pointer" can generally be any value that points to another entity, e.g., a pointer can point to another vertex). For example, suppose a dynamic grid line D1 needs to be placed between two static grid lines S1 and S2. Then, each vertex in static grid line S1 can include a pointer to the adjacent vertex in dynamic grid line D1, and the vertex in dynamic grid line D1 can include a pointer to the adjacent vertex in static grid line S2.

Note that the dynamic grid lines in the present invention can be created only when needed. For example, suppose the router is routing a net that has four off-grid pins. The process can create up to eight dynamic grid lines (two for each off-grid pin in the X and Y directions) while routing the net. Once the net has been routed, the system can remove these dynamic grid lines. In other words, the routing process does not have to maintain grid lines for the off-grid pins throughout the routing process. Instead, the routing process only creates off-grid lines when it needs to, and then removes them from the grid.

In some embodiments, the difference between vertices on the static grid and the dynamic grid is not visible to the search engine, i.e., the search engine treats the combination of the static grid and the dynamic grid as a single homogenous grid. Also note that the static grid lines in 2D grid 600 are not equally spaced.

Figure 7:
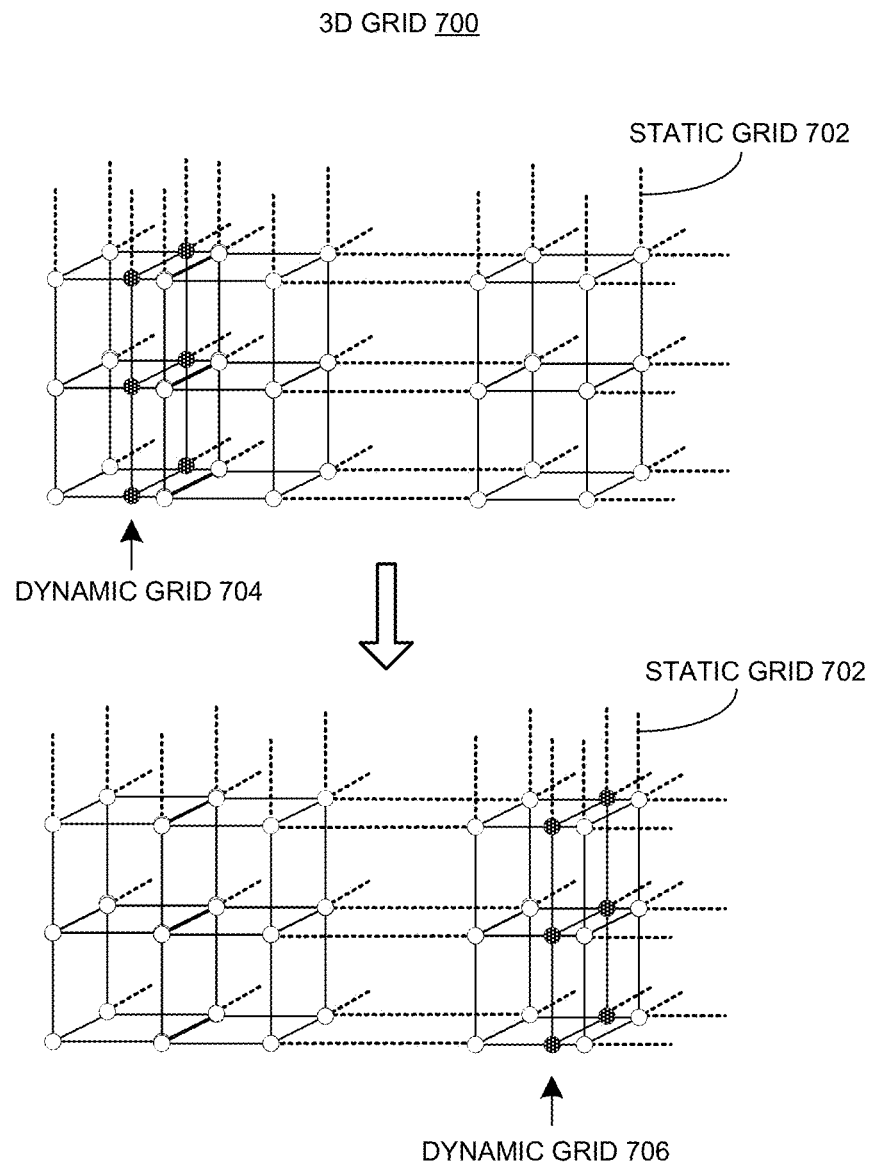
FIG. 7 illustrates a 3D grid wherein the system changes the dynamic grid as the routing process progresses in accordance with an embodiment of the present invention.

FIG. 7 illustrates how a system can change a 3D grid as the routing process progresses in accordance with an embodiment of the present invention. As illustrated in FIG. 7, 3D grid 700 includes both a static grid 702 and a varying dynamic grid. The vertices which belong to the dynamic grid are shaded, while the vertices that belong to static grid 702 are not. Note that, at one point in time, the routing process may use a dynamic grid 704 in combination with static grid 702. However, at a different point in time, the routing process may use a dynamic grid 706 located somewhere else in combination with static grid 702. Note that performing routing on the static grid can be more efficient than performing routing on the dynamic grid. Specifically, using a 3D grid that is completely dynamic, i.e., which does not include a static grid component, can be computationally inefficient.

As explained above, by using a combination of a static grid and a dynamic grid, some embodiments of the present invention can perform fast and optimal routing with a low memory footprint.

Routine Optimization

Conventional techniques typically optimize various optimization objectives in a serial or sequential manner. For example, a conventional technique may begin by eliminating "difficult" design rule violations (e.g., different-net design rule violations). Next, the conventional technique may eliminate "easy" design rule violations (e.g., same-net design rule violations). Once all design rule violations have been eliminated, the technique may then further perturb the routing solution to optimize other parameters.

Unfortunately, many optimization objectives may conflict with each other, and it is difficult to optimize new objectives on routes generated based on previously specified objectives without losing quality in previous objectives. For example, once a conventional technique has eliminated design rule violations, the technique may perturb the design to optimize DFM-related optimization objectives, but doing so may create new design rule violations, which will need to be fixed by performing an additional iteration of the routing optimization process. As a result, a sequential approach for optimizing the optimization objectives can increase the convergence time. Further, when a conventional technique eliminates DRC violations, the technique is usually oblivious to other optimization objectives. Hence, once the approach eliminates DRC violations, it may not be able to sufficiently optimize other objectives because most of the routing decisions have already been made by this stage without any consideration of the other objectives.

Furthermore, conventional routing techniques do not scale well. Specifically, a conventional technique may work when there are a small number of optimization objectives, but they do not work when there are a large number of optimization objectives. As explained above, when the system perturbs a DRC-violation-free routing solution, it may create new DRC violations, which may need to be fixed by performing an additional iteration of the routing flow. Hence, the convergence time for a sequential approach can significantly increase when the number of optimization objectives is large.

Concurrent Optimization for Routine Objectives

Some embodiments of the present invention optimize multiple objectives concurrently, instead of optimizing these objectives in a serial or sequential manner.

Note that the optimization objectives are typically not independent of each other, e.g., inserting redundant vias can cause DRC violations. Hence, to ensure that the routing solution optimizes multiple objectives, the optimization objectives need to be concurrently optimized or optimized in close loops.

Furthermore, optimization objectives need to be properly balanced. For example, two common optimization objectives are minimizing wire length and via count. However, if these two objectives are over-optimized (e.g., by assigning relatively large weights to these optimization objectives), they can lead to routing congestion and increased DRC convergence time. On the other hand, if these objectives are under-optimized, they can also lead to an increased DRC convergence time. Hence, it is desirable to ensure that the relative weights of multiple optimization objectives are well-balanced to improve convergence.

In conventional optimization techniques, a cost term is associated with each objective, and the process tries to optimize an overall cost function, which is typically a weighted sum of the individual cost terms. Note that, in these conventional optimization techniques, the weights for different objectives are often fixed, i.e., the relative weights of the various optimization objectives are fixed at the beginning of the optimization process. Unfortunately, this approach does not work well in routing optimization problems, because the number of optimization objectives can be very large (in the hundreds), and the relationship between the various optimization objectives is complex and can be design-dependent. Hence, a conventional optimization technique can take a very long time to converge to an acceptable routing solution.

Some embodiments of the present invention perform concurrent optimization by first dividing a chip design into multiple partitions. Furthermore, some embodiments use an optimization cost function that includes multiple terms which correspond to different optimization objectives. However, embodiments of the present invention determine the relative weights of these optimization objectives by analyzing the partitions.

During the detailed routing, a routing optimization process can use two levels of iterations: global iterations, and local iterations. Each global iteration can include multiple local iterations. Furthermore, a global iteration is typically performed on the entire chip design, whereas a local iteration is typically performed on a given partition.

Figure 8:
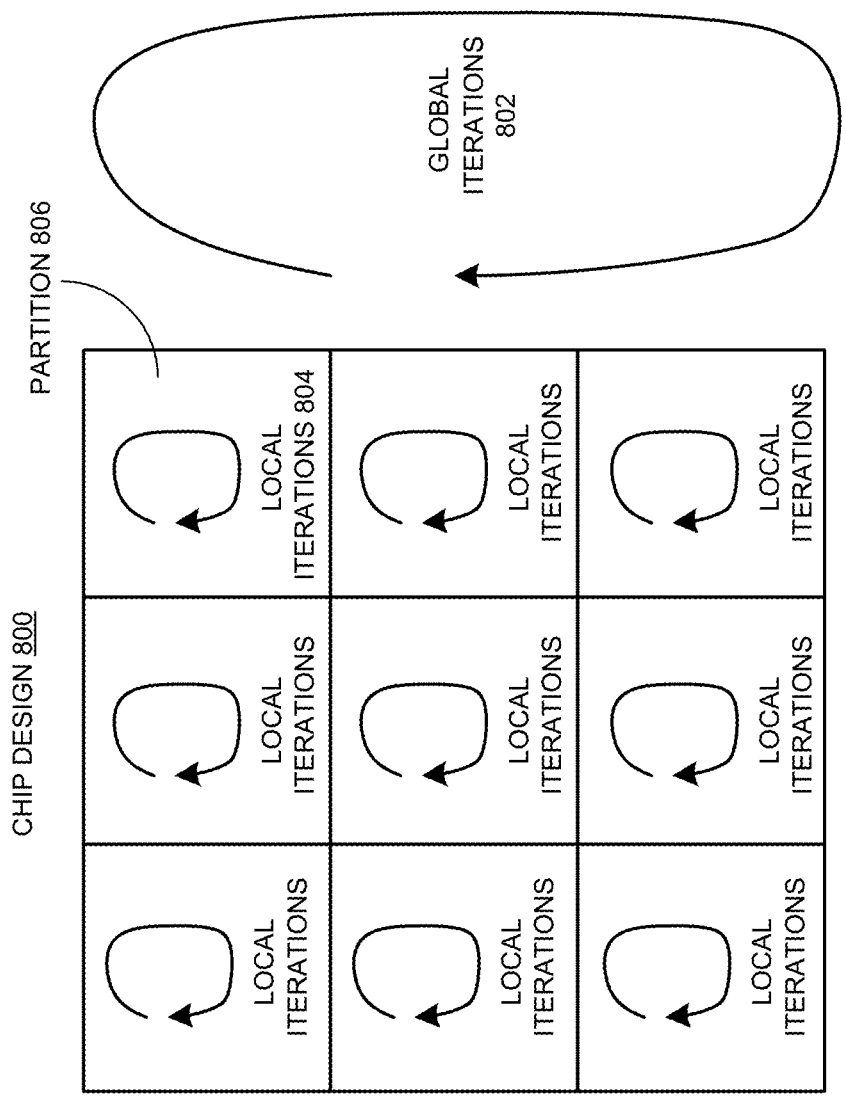
FIG. 8 illustrates performing both global iterations and local iterations on a chip design in accordance with an embodiment of the present invention.

FIG. 8 illustrates performing both global iterations and local iterations on a chip design 800 in accordance with an embodiment of the present invention. As seen in FIG. 8, chip design 800 is divided into nine partitions. These partitions can be of different sizes and shapes. However, for the sake of clarity, the partitions in FIG. 8 are shown as having the same shape and size. As shown in FIG. 8, global iterations 802 are performed on the entire chip design 800, and within each global iteration 802, local iterations are performed on each partition, such as local iterations 804 performed on partition 806. Note that the number of location iterations may be different for each partition.

In some embodiments, the system analyzes each partition to determine how to assign weights to the different optimization objectives. In one embodiment, analyzing each partition involves evaluating a degree of importance for each of the routing objectives on that partition, and subsequently assigning a weight to a routing objective based on the associated degree of importance. Typically, a higher weight is assigned to a routing objective associated with a higher degree of importance. When determining a degree of importance for each of the routing objectives, some embodiments of the present invention also take difficulty of the objectives into consideration. For example, fixing same-net spacing violations is usually more difficult than fixing different-net spacing violations. Hence, if there are many different-net spacing violations left in a partition, the system may decide not to optimize the same-net violations in the current pass by assigning a lower weight to same-net spacing rules.

In some embodiments, the system can analyze the different types of DRC violations in each partition. Next, the system can determine the weights of the routing objectives based on the analysis. Specifically, if the analysis reveals that a partition has a large number of DRC violations of a particular type, then the system may increase the weight of the cost term that is associated with that type of DRC violation, thereby causing the optimization process to try harder to decrease that type of DRC violation. On the other hand, if the system determines that a partition only has a few DRC violations, the system can reduce the weight of the cost function associated with the DRC violations.

Figure 9A:
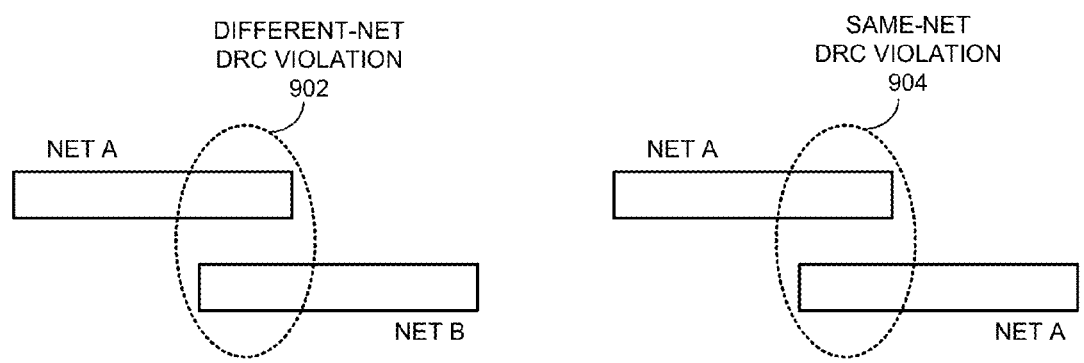
FIG. 9A illustrates a different-net DRC violation and a same-net DRC violation in accordance with an embodiment of the present invention.

As a specific example, the system can determine the number of violations for the different types of design rules. Specifically, the system can keep track of the number of (a) different-net DRC violations, (b) same-net DRC violations, and (c) antenna DRC violations. FIG. 9A illustrates a different-net DRC violation and a same-net DRC violation in accordance with an embodiment of the present invention. As illustrated in FIG. 9A, a different-net DRC violation 902 indicates spacing violations between shapes belonging to two different nets, namely, Net A and Net B. A same-net DRC violation 904 indicates spacing violations between shapes belonging to the same net, namely, Net A. Both different-net and same-net DRC violations can cause problems during the operation of the circuit (e.g., short or open circuit problems).

Figure 9B:
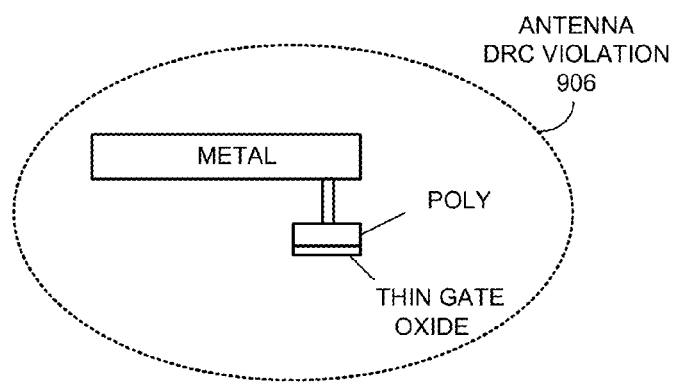
FIG. 9B illustrates an antenna DRC violation in accordance with an embodiment of the present invention.

On the other hand, antenna DRC violations can cause gate oxide damage due to the accumulation of charge during manufacturing. FIG. 9B illustrates an antenna DRC violation 906 in accordance with an embodiment of the present invention. Note that an antenna DRC violation depends on various factors, such as the wire area and the charge tolerance of the gate, etc.

Note that, if a partition has a large number of different-net DRC violations, it may be difficult to have an overall convergence if the optimization process attempts to optimize every objective at the same time. Instead, the routing optimization process may focus on eliminating or reducing different-net DRC violations before attempting to eliminate same-net DRC violations and/or antenna DRC violations. Furthermore, because fixing same-net spacing violations is usually more difficult than fixing different-net spacing violations, the system also takes into account the difficulties of the objectives when assigning weights to the different cost terms. Hence, after the analysis stage, the system may assign a higher weight to the different-net DRC violation cost term so that that optimization process focuses on eliminating or reducing different-net DRC violations during the iterative optimization process. Note that the system may different weights in different partitions based on the analysis of the partitions.

As the global and local iterations progress, if the number of different-net DRC violations decreases to a level where other optimization objectives can be considered, the system may accordingly adjust the weights of the same-net DRC violations and the antenna DRC violations cost terms. For example, the system may decrease the weight for the cost term associated with the different-net DRC violations and increase the weights for the cost terms associated with the same-net DRC violations and the antenna DRC violations. The system subsequently uses the updated weights to construct an updated cost function as a weighted sum of the individual cost functions.

Figure 10:
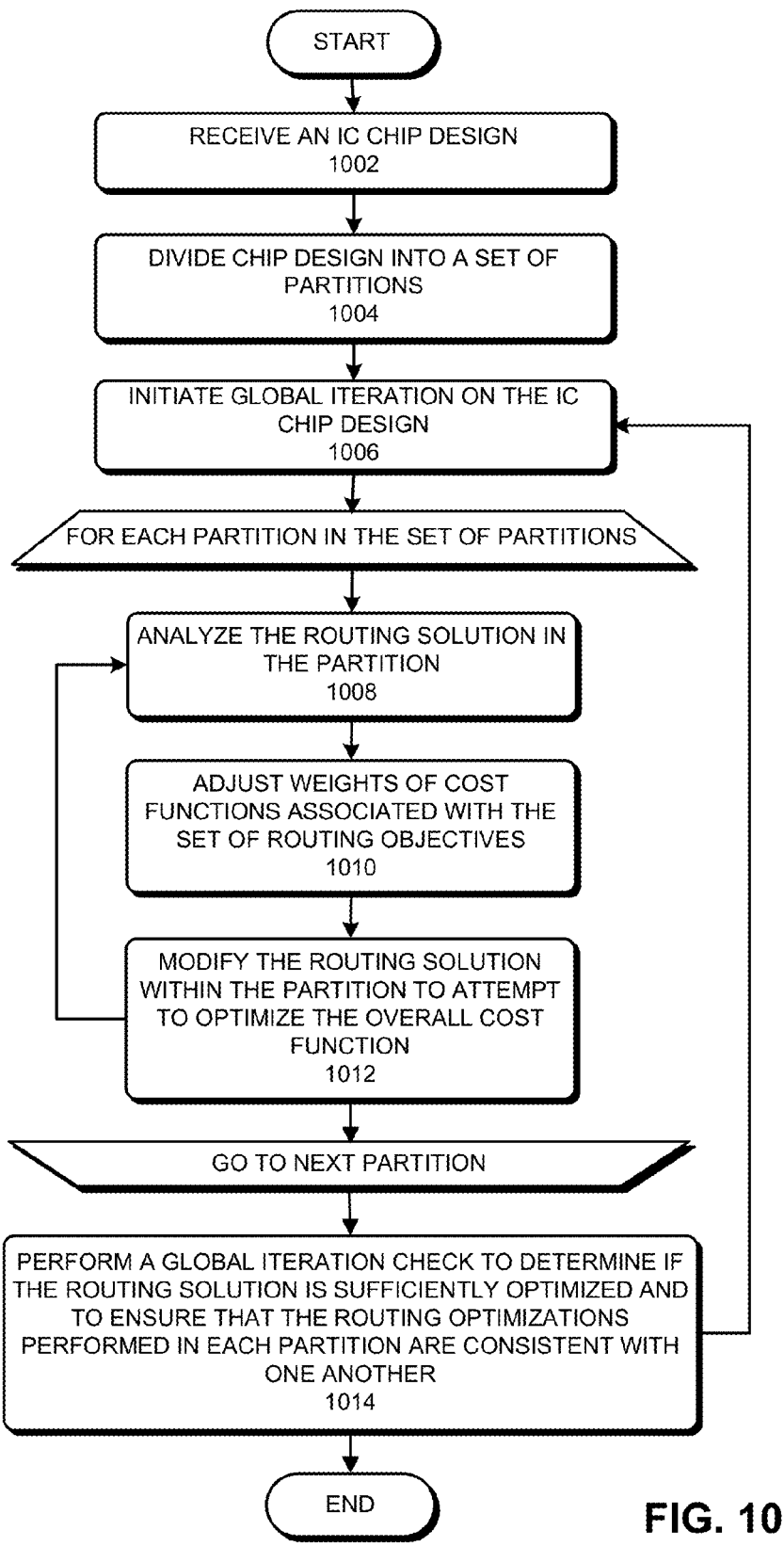
FIG. 10 presents a flowchart illustrating a process for concurrently optimizing multiple objectives in accordance with an embodiment of the present invention.

FIG. 10 presents a flowchart illustrating a process for concurrently optimizing multiple objectives in accordance with an embodiment of the present invention. During operation, the system starts by receiving an IC chip design (step 1002). In some embodiments, the IC chip design includes a routing solution which needs to be optimized and a set of routing objectives associated with the optimization process. The system then partitions the IC chip design into a set of partitions (step 1004). Next, the system initiates global iteration on the IC chip design (step 1006). During this step, the system may prepare the partitions so that routing optimization iterations can be performed on each partition.

Next, for each partition in the set of partitions, the system can analyze the routing solution in the partition (step 1008). In one embodiment, the system determines the importance of each routing objective in the routing solution, for example, based on both the total numbers of violations and a degree of difficulty of each routing objective. The system then adjusts weights of cost functions associated with the set of routing objectives based on the analysis (step 1010). For example, the system can assign weights based on the determined importance of each routing objective. In one embodiment, the system further constructs an overall cost function as a weighted sum of the individual cost functions.

The system next modifies the routing solution within the partition to attempt to optimize the overall cost function (step 1012). In some embodiments, the system modifies the routing configuration within the partition by performing a rip-up-and-reroute operation within the partition. To continue performing local iterations on a given partition, the system can loop back to step 1008 after step 1012 so that weights of the cost functions can be further adjusted. At a certain point, the system can terminate the local iterative process within a partition when the overall cost function is sufficiently optimized. Note that although the process of FIG. 10 illustrates processing the set of partitions in a sequential manner, some embodiments can process the set of partitions in parallel. Yet other embodiments can process the set of partitions in a combination of sequential and parallel processes.

After completing local iterative processes for the set of partitions, the system can then perform a global iteration check to determine if the routing solution is sufficiently optimized and to ensure that the routing optimizations performed in each partition are consistent with one another (step 1014). In some embodiments, the system may adjust the routing solution at the boundaries of the set of partitions to ensure consistency between adjacent partitions.

If the "global iteration check" step determines that the global iterative process is not over, the system may loop back to the "initiate global iteration" step 1006 after the "global iteration check" step 1014. The system subsequently performs another round of iterative optimization on the adjusted routing solution over the set of partitions.

Soft Routine Rules

Figure 11:
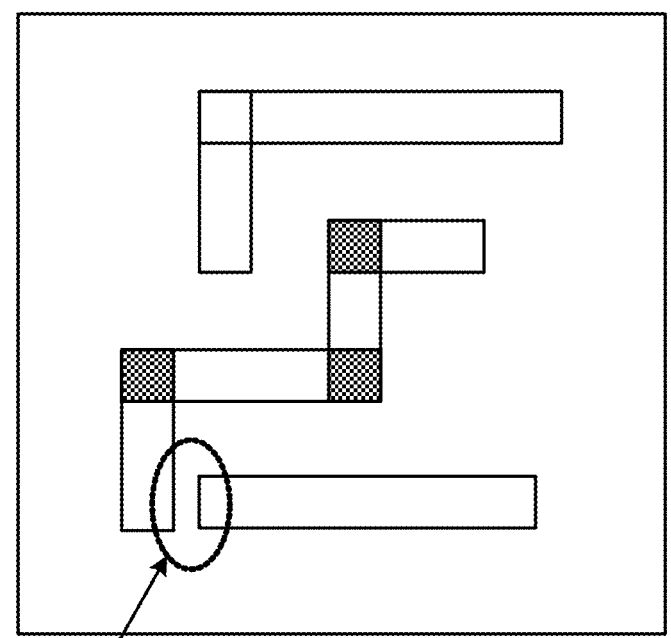
FIG. 11 illustrates a hard spacing rule violation within an exemplary IC chip design in accordance with an embodiment of the present invention.

As mentioned previously, a circuit design must satisfy certain foundry design rules before it can be taped-out. Specifically, a foundry may specify spacing rules that a design must meet, e.g., the foundry may specify the minimum distance between two shapes in the circuit design. If the circuit design does not meet the design rules, the circuit design may not be signed-off. FIG. 11 illustrates a hard spacing rule violation 1102 within an exemplary IC chip design 1100. These foundry design rules are referred to as "hard rules" in the discussion below.

After satisfying the foundry-defined minimum distance requirement, a larger distance between two shapes can usually improve the manufacturing yield. If we create hard spacing rules for design for manufacturing (DFM)-related criteria, we may never be able to sign-off circuit designs because the circuit may never be able to satisfy all the spacing rules.

Some embodiments of the present invention specify such a spacing requirement as a "soft spacing rule" instead of a hard spacing rule. Besides DFM-related criteria, other soft spacing rules can include user-defined rules. For example, a via may be placed in an IC design according to a hard rule of minimum spacing (e.g., at least 0.3 µm around the vias). At the same time, soft rules can be applied to reserve room around an existing via (e.g., at least 0.5 µm around the vias) so that a redundant via can be added later. Note that conventional routing techniques typically treat all rules (both hard and soft rules) with equal importance.

In conventional techniques, a hard spacing rule can be represented by creating "blocks" in the 3D grid so that the search engine gives a very high cost for wires that violate hard spacing rules. If we create "blocks" in the 3D grid for soft spacing rules, it would cause the routing engine to treat the soft spacing rules in the same manner as the hard spacing rules, which defeats the purpose of using soft spacing rules.

Some embodiments of the present invention use a novel and non-obvious approach for handling the soft spacing rules. Specifically, some embodiments specify DFM-related criteria and other soft spacing rules to a router in a manner that enables the router to ensure that the foundry rules are satisfied with higher priority, but at the same time, it also takes into account DFM (or any other) criteria in a best effort fashion.

Some embodiments of the present invention assign weights to both hard spacing rules and soft spacing rules to guide the search engine. The weights associated with the hard spacing rules are typically substantially higher than those associated with the soft spacing rules.

Note that the router will attempt to satisfy all routing rules. Unfortunately, this may not be possible in all cases. When the router is unable to satisfy all the routing rules, the router can use the weight associated with the rules to determine which rule to satisfy and which rule to violate. Specifically, when the routing resources are limited and the router has to choose between violating one of two rules, the router will violate the rule with the lower weight. In some embodiments, the router may decide to violate the minimum weighted subset of rules, i.e., the subset of rules with the minimum aggregate weight.

If soft rules are not processed properly, they can substantially increase the convergence time, because the router may keep iterating to satisfy the soft rules. Note that this fact may be counter-intuitive, because intuitively it seems that using soft rules can reduce convergence time. To overcome the convergence problem, some embodiments of the present invention associate an effort-level with each rule. Note that associating an effort-level with a rule is non-obvious. Specifically, since we have already associated a weight with each rule, it seems unnecessary to also associate an effort-level. However, this non-obvious insight can substantially improve routing convergence, as is described below.

If the effort-level for a rule is high, the router spends more time and resources trying to satisfy the rule. On the other hand, if the effort-level for a rule is low, the router spends less time and fewer resources trying to satisfy the rule. For example, the effort-level can be used for the router to determine the number of iterations, routing convergence time, or the number of rip-up and reroutes that the router is allowed to perform for satisfying the rule. The system can define multiple effort-levels. For example, the system can define low, medium, and high effort-levels.

The effort-level allows the user to directly control the amount of time the router spends on satisfying the different rules and/or optimizing the optimization objectives. Note that generic optimization techniques typically create a single optimization function which represents the overall "quality" of the solution. However, in these conventional optimization techniques, the user typically does not have a mechanism by which the user can control how much time the optimization process spends on optimizing a particular optimization objective. In contrast to such generic optimization techniques, some embodiments of the present invention provide the user with a fine-grained control over how much time the router spends on satisfying a particular optimization objective.

Note that, by associating both a weight and an effort-level with a routing rule, a router can make more sophisticated decisions on which routing rule has a higher priority, and which one has a lower priority. Table 1 presents an exemplary decision table which includes four combinations of the weight and the effort-level using two weight options and two effort-levels. Note that only three of the four combinations (shown as "Yes" in the table) are typically considered by a router in embodiments of the present invention. Specifically, a routing rule which is associated with a low weight and a high effort-level (shown as "No" in the table) may be undesirable, because the combination does not logically make sense and can cause a substantial increase in the convergence time if processed. Note that while Table 1 assumes only two effort-levels, other embodiments can use more effort-levels, and hence creating more combinations between weights and effort-levels.

TABLE 1

|  | High Weight | Low Weight |
| --- | --- | --- |
| High Effort | Yes | No |
| Low Effort | Yes | Yes |

Figure 12:
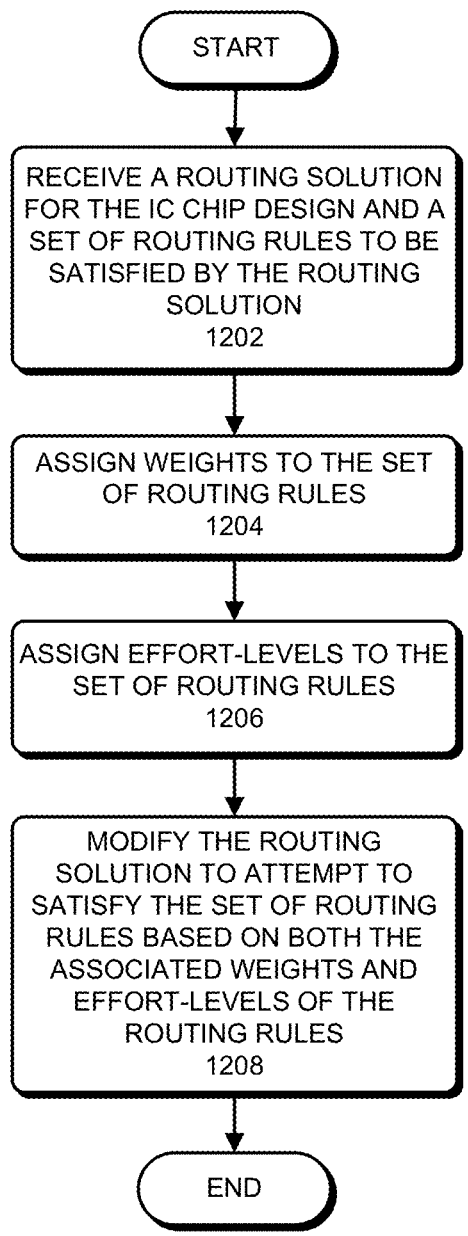
FIG. 12 presents a flowchart illustrating a process for satisfying multiple routing rules during routing of an IC chip design in accordance with an embodiment of the present invention.

FIG. 12 presents a flowchart illustrating a process for satisfying multiple routing rules during routing of an IC chip design in accordance with an embodiment of the present invention.

During operation, the system receives a routing solution for the IC chip design and a set of routing rules to be satisfied by the routing solution (step 1202). The system subsequently assigns weights to the set of routing rules, wherein a higher weight for a routing rule indicates a higher importance of the routing rule (step 1204). Note that during routing or rerouting stages, weight decides which rule to violate in case of a conflict (e.g., one of the rules must be violated due to limited routing resources). The system additionally assigns effort-levels to the set of routing rules, wherein an effort-level for a routing rule indicates how much effort is used to specifically try to fix the corresponding rule violations (step 1206). In other words, a higher effort-level indicates that the router can use a higher amount of resources to satisfy the routing rule. Next, the system modifies the routing solution to attempt to satisfy the set of routing rules based on both the associated weights and effort-levels of the set of routing rules (step 1208). In some embodiments, the system modifies the routing solution in an attempt to simultaneously fix rule violations for all the routing rules based on their associated weights and effort-levels.

Redundant Via Insertion

Design for manufacturing (DFM) is a very important consideration in EDA design flow. In conventional approaches, DFM-related adjustments to the circuit design are typically handled during the "chip finishing" stage. Specifically, DFM-related adjustments are made to the IC design after the placement, clock, routing, and optimization have been performed.

Redundant via insertion is an important DFM-related adjustment because it can significantly improve the manufacturing yield. The number of redundant vias inserted in the circuit design is a metric which can be conveniently measured, and different EDA tools are often compared based on this metric.

Unfortunately, conventional techniques for inserting redundant vias are often ad-hoc, because these techniques perform the redundant via insertion as a post-processing step after placement, routing, and timing optimization decisions are already made. Because a router typically does not reserve space for redundant vias during a routing process, the number of redundant vias in the final design can suffer due to lack of routing resources around vias in the post-processing stage.

Furthermore, when redundant vias are added, the resistance and capacitance of the circuit design are often affected. Hence, when a redundant via is added after timing optimization, the system may need to perform another timing optimization operation to account for the changes in the timing of the design. This, however, defeats the purpose of a regular timing optimization operation.

Figure 13:
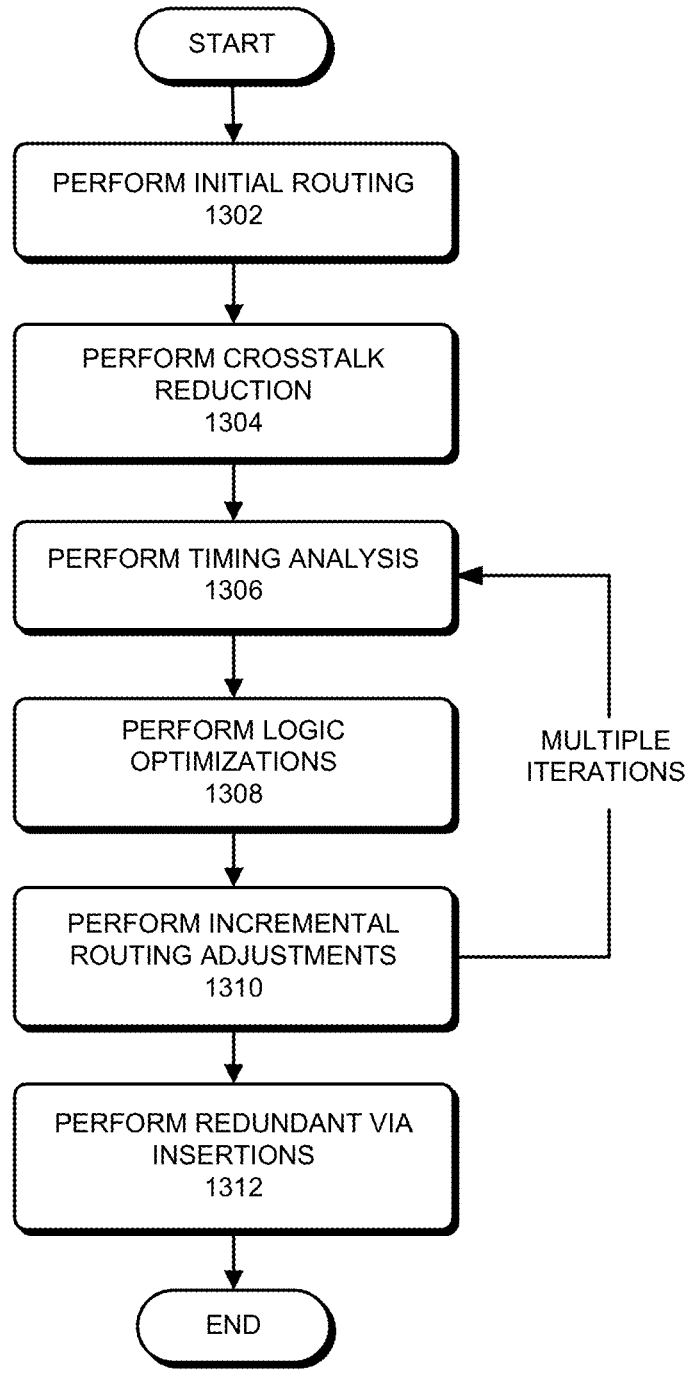
FIG. 13 presents a flowchart illustrating a conventional routing optimization flow which performs redundant via insertion after timing optimization.

FIG. 13 presents a flowchart illustrating a conventional routing optimization flow which performs redundant via insertion after timing optimization.

As is illustrated in FIG. 13, the conventional routing optimization flow typically performs an initial routing (step 1302), and then performs crosstalk reduction optimizations on the initial routing (step 1304). Next, the system performs timing analysis (step 1306), and then performs logic optimizations based on the timing analysis (step 1308). During logic optimization step 1308, the system can size up the cell, add or delete buffer to fix timing violations. However, logic optimization step 1308 can cause the current routing to become invalid, e.g., the routing may violate design rules or contain open nets once the logic optimization step is completed. Hence, the system may need to perform incremental routing adjustments based on the logic optimizations (step 1310), and then go back to timing analysis step 1306. After multiple iterations, the router may converge to a circuit design that satisfies both the design rules and timing constraints. In the conventional flow, the system performs redundant via insertions after the above iterative process is completed (step 1312).

Unfortunately, because redundant via insertion can affect timing, the system may need to go back to step 1306 and perform new timing analysis on the circuit design after redundant via insertion step 1312 to ensure that no timing constraints were violated by the redundant via insertion. If a timing constraint was violated, the system may have to go through the whole process again, which can substantially increase the convergence time for the routing optimization stage.

To avoid impacting the timing of the design significantly, some conventional techniques may choose to restrict adding redundant vias on the timing-critical nets in the design. Unfortunately, this constraint can reduce the number of redundant vias in the final circuit design, which subsequently causes degradation in the DFM objectives. Furthermore, due to crosstalk, the timing of a net is not only affected by modifications to the net itself, but also by modifications to nearby nets. If one expands the list of timing-critical nets to include nearby nets, it can lead to even fewer redundant vias being inserted. To summarize, conventional techniques for adding redundant vias are ad-hoc, and can increase design convergence time and lead to suboptimal circuit designs.

In contrast to the conventional techniques, some embodiments of the present invention perform redundant via insertion in combination with timing optimization so that the timing optimization can incorporate the timing effects of redundant via insertion.

Figure 14:
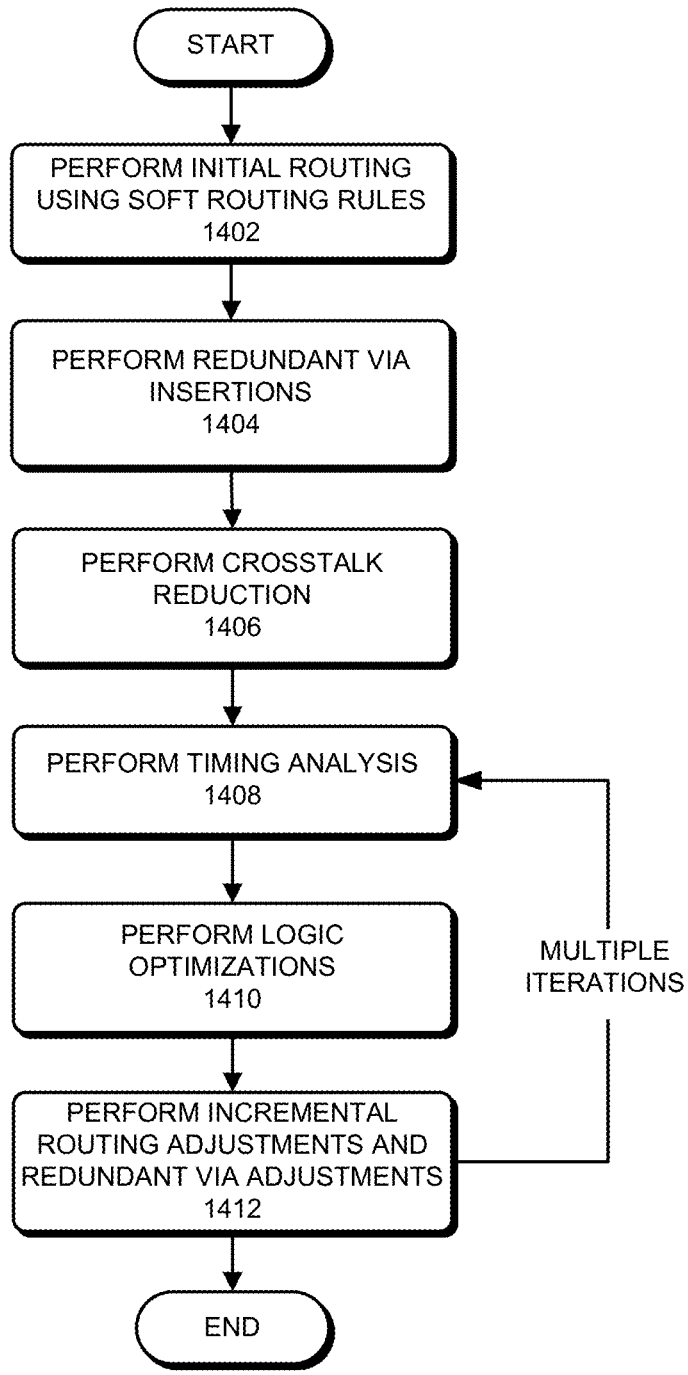
FIG. 14 presents a flowchart illustrating a process for concurrently performing redundant via insertion and timing optimization during an IC design in accordance with an embodiment of the present invention.

FIG. 14 presents a flowchart illustrating a process for concurrently performing redundant via insertion and timing optimization during an IC design in accordance with an embodiment of the present invention.

During operation, the system of the present invention performs initial routing using soft routing rules (step 1402). The system then performs redundant via insertions (step 1404). Next, the system performs crosstalk reduction optimizations (step 1406), which is followed by timing analysis (step 1408). The system then performs logic optimizations based on the timing analysis (step 1410). However, logic optimization step 1410 can cause both timing and existing redundant vias to become invalid in the IC design. Hence, the system performs incremental routing adjustments and redundant via adjustments based on the logic optimizations (step 1412). In some embodiments, the system adjusts the redundant vias by removing one or more redundant vias from the IC design to allow new wires to be added into the IC design. The system subsequently returns to timing analysis step 1408 and repeats steps 1408-1412. After multiple iterations, the router may converge to a final circuit design that satisfies both the design rules and timing constraints. Note that, although in FIG. 14, timing analysis step 1408 is performed after performing crosstalk reduction, some embodiments of the present invention can perform timing analysis in multiple stages in the flow of redundant via insertion. For example, timing analysis can be performed both before and after crosstalk reduction optimization 1406. Hence, the present invention is not limited to the specific embodiment illustrated in FIG. 14.

In comparison to the conventional flow, the process flow shown in FIG. 14 performs redundant via insertion step 1404 before the post-route optimization steps. Furthermore, note that the initial routing stage uses soft routing rules, such as soft spacing rules, to ensure that the initial routing is sufficiently optimized for inserting redundant vias. Soft spacing rules applied on routing vias attempt to reserve some routing resources around routing vias without impacting regular design rule convergence, leading to a higher redundant via insertion rate. Because the redundant vias are inserted before any post-route timing optimization, and they are up-kept during ECO (Engineering Change Order) routing after post-route logic optimization, the effects of redundant vias are fully observed and dealt with during post-route optimization. Consequently, the system does not need to constrain the redundant via insertion to avoid touching timing-sensitive nets, leading to a higher overall redundant via rate and faster timing convergence. (Note that ECO routing makes incremental changes to the chip design.) The routing solution produced by the flow shown in FIG. 14 results in designs that have substantially larger number of redundant vias than the designs produced by the flow shown in FIG. 13.

Figure 15:
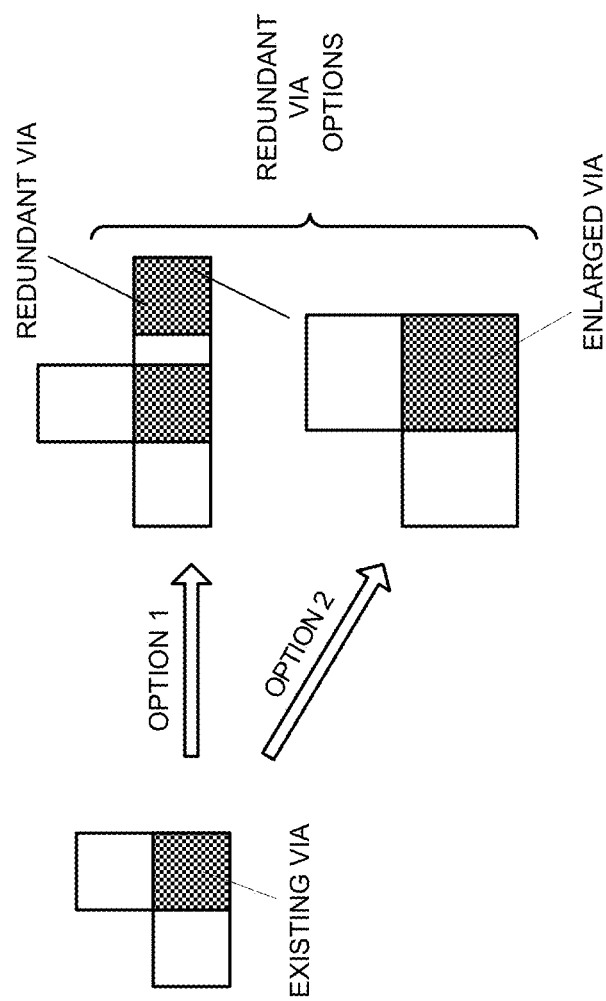
FIG. 15 illustrates some exemplary redundant via options that can be used to improve yield in accordance with an embodiment of the present invention.

FIG. 15 illustrates some exemplary redundant via options that can be used to improve yield in accordance with an embodiment of the present invention. Specifically, as illustrated in FIG. 15, the redundant via options can include, but are not limited to, inserting one or more additional via next to an existing via ("OPTION 1"), increasing the metal surrounds the via (not shown in FIG. 15), and increasing the size of an existing cut ("OPTION 2"). Note that some of the latest technologies allow increased cut size, but other existing technologies do not allow this option, and only allow metal surrounds to be increased. Regardless of which redundant via insertion technique is used, the process modifies the dimensions of existing shapes in the design. When the dimensions of a shape are modified, it can cause timing constraint violations or design rule violations.

Note that some embodiments of the present invention enable the system to select a redundant via option that satisfies timing constraints or design rules. For example, each redundant via option may have an associated preference weight. If one redundant via option is preferred over another, a user can assign a higher weight to the preferred redundant via option.

Figure 16B:
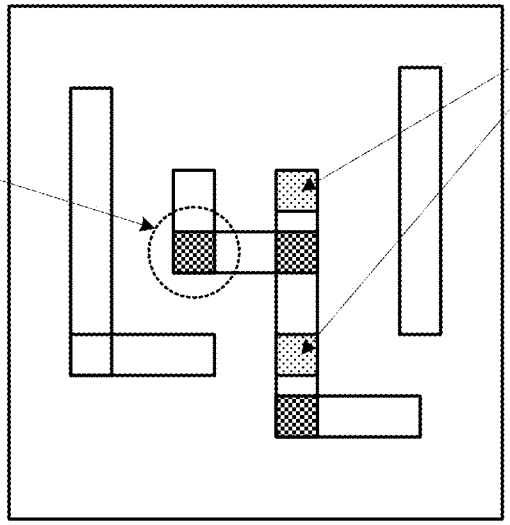
FIG. 16B illustrates a process of selection of different redundant via options at different locations in chip design in accordance with an embodiment of the present invention.
Figure 16A:
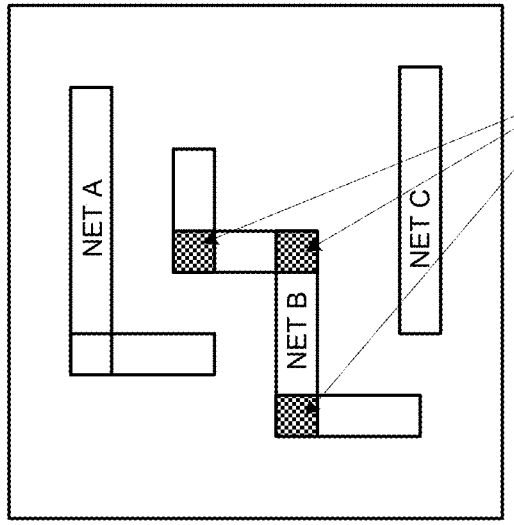
FIG. 16A illustrates an exemplary IC chip design which comprises a number of vias in accordance with an embodiment of the present invention.

FIG. 16A illustrates an exemplary IC chip design 1600 which comprises a number of vias 1602. Note that there are three nets, Net A, Net B, and Net C, within chip design 1600, and vias 1602 are located on Net B. Furthermore, FIG. 16B illustrates a process of selecting different redundant via options at different locations in chip design 1600 in accordance with an embodiment of the present invention. As illustrated in FIG. 16B, the router adds redundant vias 1604 for two of the three vias 1602 at two locations, but not at a third location. This is because adding a redundant via at the third location would violate a design rule. In this manner, embodiments of the present invention produce circuit designs which include a larger number of redundant vias, and which satisfy design rules and timing constraints. Furthermore, some embodiments of the present invention achieve these objectives without affecting the convergence time required to obtain an optimized routing solution.

Figure 17:
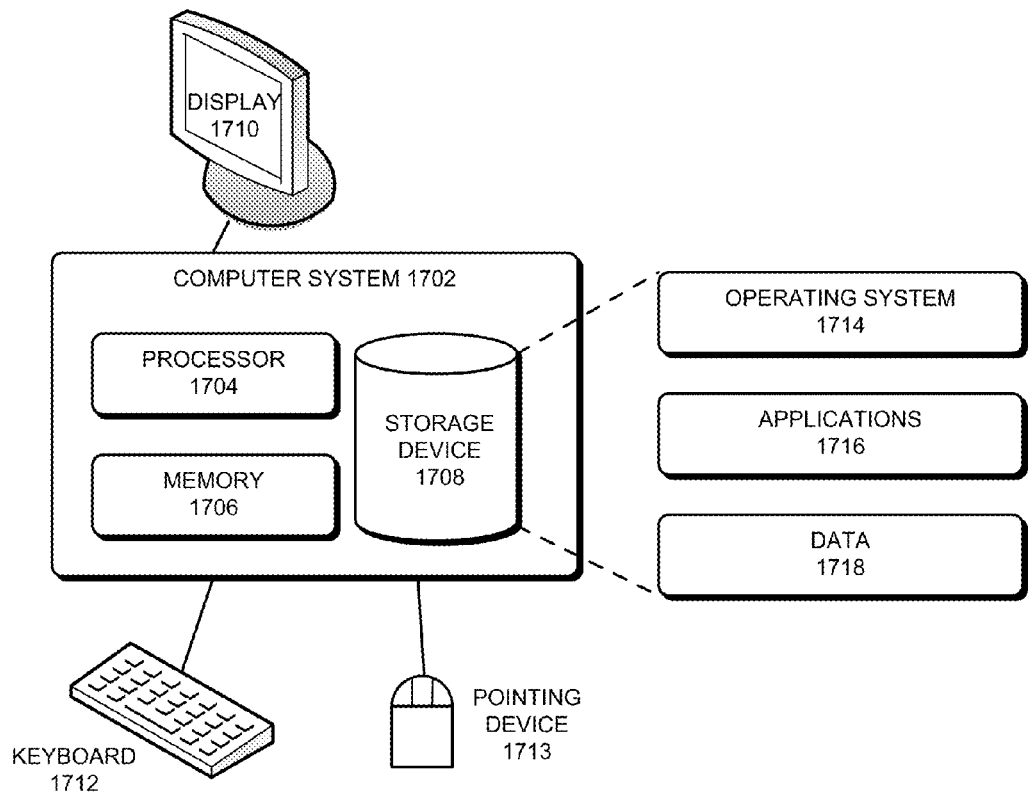
FIG. 17 illustrates a computer system in accordance with an embodiment of the present invention.

FIG. 17 illustrates a computer system in accordance with an embodiment of the present invention. Computer system 1702 includes a processor 1704, a memory 1706, and a storage device 1708. Furthermore, computer system 1702 can be coupled to a display device 1710, a keyboard 1712, and a pointing device 1713.

Storage device 1708 can store operating system 1714, applications 1716, and data 1718. Applications 1716 can include instructions, which when executed by computer system 1702, can cause computer system 1702 to perform methods and/or processes described in this disclosure. Specifically, applications 1716 can include instructions for routing connections using a dynamic grid, for concurrently optimizing multiple routing objectives, for concurrently performing redundant via insertion and timing optimization, and/or for satisfying routing rules. Data 1718 can include any data that is required as input or that is generated as output by the methods and/or processes described in this disclosure.

Figure 18:
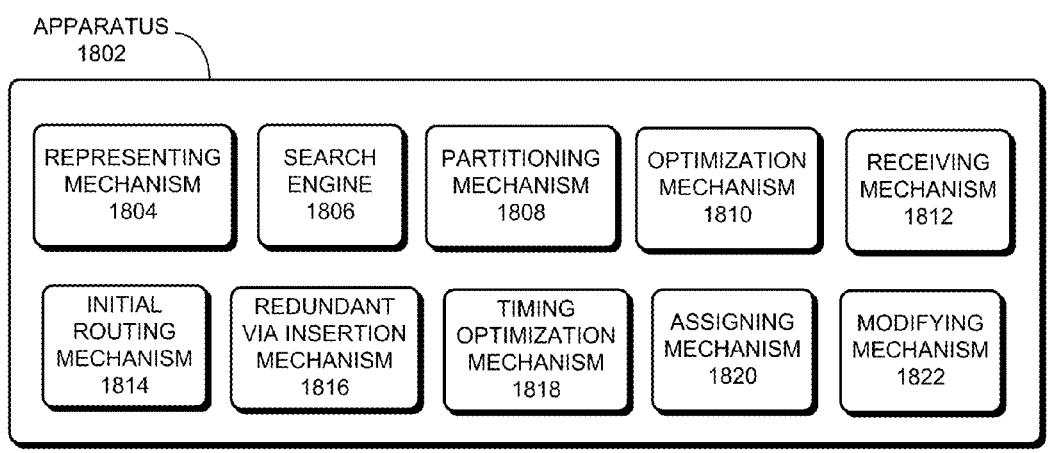
FIG. 18 illustrates an apparatus in accordance with an embodiment of the present invention.

FIG. 18 illustrates an apparatus in accordance with an embodiment of the present invention.

Apparatus 1802 can comprise a plurality of mechanisms which may communicate with one another via a wired or wireless communication channel. Apparatus 1802 may be realized using one or more integrated circuits, and apparatus 1802 may include fewer or more mechanisms than those shown in FIG. 18. Further, apparatus 1802 may be integrated in a computer system, or it may be realized as a separate device which is capable of communicating with other computer systems and/or devices. Specifically, apparatus 1802 can include one or more of the following mechanisms and/or engines: representing mechanism 1804, search engine 1806, partitioning mechanism 1808, optimization mechanism 1810, receiving mechanism 1812, initial routing mechanism 1814, redundant via insertion mechanism 1816, timing optimization mechanism 1818, and assigning mechanism 1820.

In some embodiments, representing mechanism 1804 can be configured to represent routing resources, and search engine 1806 can be configured to search for paths. In some embodiments, partitioning mechanism 1808 can be configured to partition a circuit design into a set of partitions, and optimization mechanism 1810 can be configured to optimize a routing solution in a partition. In some embodiments, receiving mechanism 1812 can be configured to receive a circuit design, initial routing mechanism 1814 can be configured to perform an initial routing on the circuit design, redundant via insertion mechanism 1816 can be configured to insert redundant vias in the circuit design, and timing optimization mechanism 1818 may be configured to perform timing optimization on the circuit design. In some embodiments, receiving mechanism 1812 can be configured to receive a routing solution and a set of routing rules, assigning mechanism 1820 can be configured to assign weights and effort levels to the routing rules, and modifying mechanism 1822 can be configured to modify the routing solution to satisfy the routing rules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for concurrently optimizing multiple routing objectives during routing of an integrated circuit (IC) chip design, the method comprising:
   receiving a routing solution for the IC chip design and a set of routing objectives;
   partitioning the IC chip design into a set of partitions; and
   optimizing, by a computer, the routing solution by concurrently processing each partition in the set of partitions, wherein for each partition in the set of partitions, said processing involves performing an iterative process comprising:
      analyzing the routing solution within the partition to determine a set of weights for the set of routing objectives for the partition;
      constructing a cost function based on the set of weights for the set of routing objectives for the partition;
      if the cost function is not optimal, modifying the routing solution within the partition; and
      wherein said iterative process repeats said analyzing, said constructing, and said modifying to attempt to optimize the cost function.

2. The method of claim 1, wherein said analyzing the routing solution to determine a set of weights for the set of routing objectives involves:
   evaluating a degree of importance for each of the routing objectives; and
   assigning a weight to a routing objective based at least on the evaluated degree of importance associated with said routing objective.

3. The method of claim 2, wherein said assigning a weight to a routing objective based at least on the evaluated degree of importance associated with said routing objective involves assigning a higher weight to a routing objective with a higher degree of importance.

4. The method of claim 2, wherein said evaluating a degree of importance for each routing objective involves counting a total number of violations associated with a routing objective within the partition, wherein a higher number of violations is associated with a higher degree of importance.

5. The method of claim 1, wherein said constructing the cost function based on the set of weights for the set of routing objectives involves:
   obtaining individual cost functions associated with the respective routing objectives; and
   using the set of weights to construct the cost function as a weighted sum of the individual cost functions.

6. The method of claim 1, wherein said modifying the routing solution within the partition to attempt to optimize the cost function further involves performing a rip-up-and-reroute operation within the partition to attempt to optimize the cost function.

7. The method of claim 1, further comprising terminating the iterative process within a partition when the cost function associated with the partition is sufficiently optimized.

8. The method of claim 1, wherein each partition in the set of partitions is of the same size.

9. The method of claim 1, wherein the set of routing objectives includes one or more of:
   different-net design rule check (DRC);
   same-net DRC; or
   antenna DRC.

10. The method of claim 1, wherein the routing solution of the IC chip design includes routing paths located on multiple metal layers.

11. A non-transitory computer-readable storage medium storing instructions that, when executed by a computer, cause the computer to perform a method for concurrently optimizing multiple routing objectives during routing of an integrated circuit (IC) chip design, the method comprising:
   receiving a routing solution for the IC chip design and a set of routing objectives;
   partitioning the IC chip design into a set of partitions; and
   optimizing the routing solution by concurrently processing each partition in the set of partitions, wherein for each partition in the set of partitions, said processing involves performing an iterative process comprising:
      analyzing the routing solution within the partition to determine a set of weights for the set of routing objectives for the partition;
      constructing a cost function based on the set of weights for the set of routing objectives for the partition;
      if the cost function is not sufficiently optimized, modifying the routing solution within the partition; and
      wherein said iterative process repeats said analyzing, said constructing, and said modifying to attempt to optimize the cost function.

12. The non-transitory computer-readable storage medium of claim 11, wherein said analyzing the routing solution to determine a set of weights for the set of routing objectives involves:
   evaluating a degree of importance for each of the routing objectives; and
   assigning a weight to a routing objective based at least on the evaluated degree of importance associated with said routing objective.

13. The non-transitory computer-readable storage medium of claim 12, wherein said assigning a weight to a routing objective based at least on the evaluated degree of importance associated with said routing objective involves assigning a higher weight to a routing objective with a higher degree of importance.

14. The non-transitory computer-readable storage medium of claim 12, wherein said evaluating a degree of importance for each routing objective involves counting a total number of violations associated with a routing objective within the partition, wherein a higher number of violations is associated with a higher degree of importance.

15. The non-transitory computer-readable storage medium of claim 11, wherein said constructing the cost function based on the set of weights for the set of routing objectives involves:
   obtaining individual cost functions associated with the respective routing objectives; and
   using the set of weights to construct the cost function as a weighted sum of the individual cost functions.

16. The non-transitory computer-readable storage medium of claim 11, wherein said modifying the routing solution within the partition to attempt to optimize the cost function further involves performing a rip-up-and-reroute operation within the partition to attempt to optimize the cost function.

17. The non-transitory computer-readable storage medium of claim 11, wherein the method further comprising terminating the iterative process within a partition when the cost function associated with the partition is sufficiently optimized.

18. The non-transitory computer-readable storage medium of claim 11, wherein each partition in the set of partitions is of the same size.

19. The non-transitory computer-readable storage medium of claim 11, wherein the set of routing objectives includes one or more of:

different-net design rule check (DRC);

same-net DRC; or antenna DRC.

20. The non-transitory computer-readable storage medium of claim 11, wherein the routing solution of the IC chip design includes routing paths located on multiple metal layers.

21. A system that concurrently optimizes multiple routing objectives during routing of an integrated circuit (IC) chip design, comprising:

a receiving mechanism configured to receive a routing solution for the IC chip design and a set of routing objectives;

a partition mechanism configured to partition the IC chip design into a set of partitions; and an optimization mechanism configured to optimize the routing solution by concurrently processing each partition in the set of partitions, wherein for each partition in the set of partitions, said processing involves performing an iterative process comprising:

analyzing the routing solution within the partition to determine a set of weights for the set of routing objectives for the partition;

constructing a cost function based on the set of weights for the set of routing objectives for the partition;

if the cost function is not optimal, modifying the routing solution within the partition; and wherein said iterative process repeats said analyzing, said constructing, and said modifying to attempt to optimize the cost function.

\* \* \* \* \*